United States Patent Office
3,713,007
Patented Jan. 23, 1973

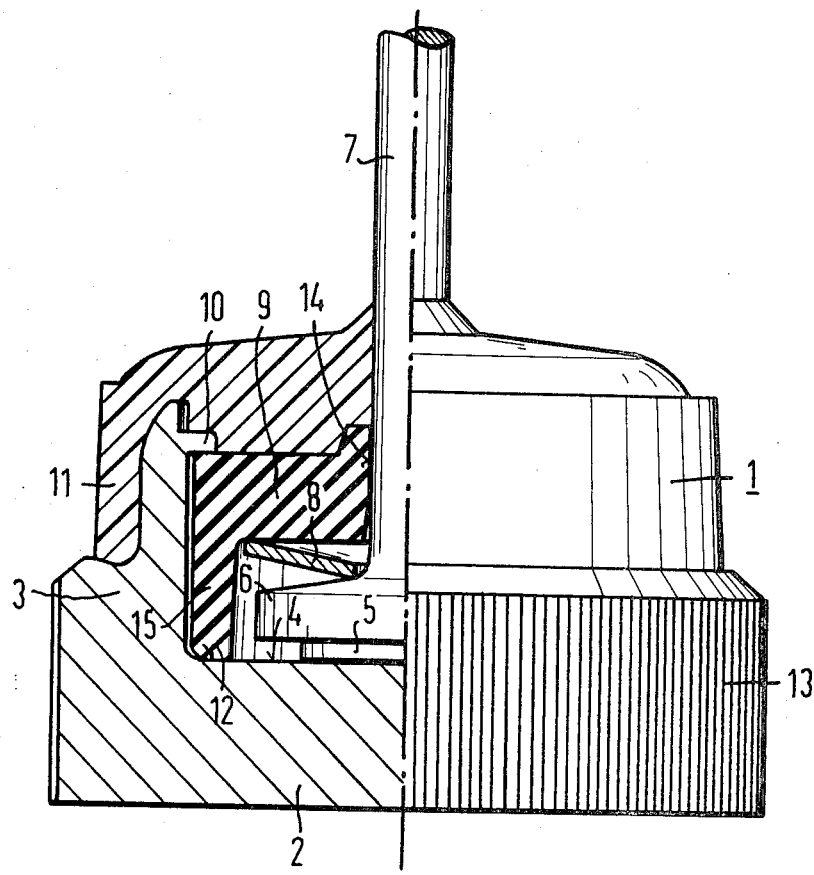

3,713,007
SEMICONDUCTOR COMPONENT WITH SEMICON-
DUCTOR BODY SEALED WITHIN SYNTHETIC
COVERING MATERIAL
Georg Walter, Munich, Germany, assignor to Siemens
Aktiengesellschaft, Berlin and Munich, Germany
Filed May 24, 1971, Ser. No. 146,087
Claims priority, application Germany, June 4, 1970,
P 20 27 598.3
Int. Cl. H01l 3/00, 5/00
U.S. Cl. 317—234 R
1 Claim

ABSTRACT OF THE DISCLOSURE

A semiconductor component has a semiconductor body, a cup-shaped housing having a wall and a base conjointly defining a hollow for receiving the semiconductor body. A cover having an opening and a wall-like extension surrounding the semiconductor is also provided. An electrode for the semiconductor extends through this opening in electrically insulated relation to the cover. The wall-like extension has an end surface whereat the cover rests upon the base and a pressure member exerts a force on the cover so that the end surface presses against the base in seal tight relation to the latter, whereby the synthetic material is prevented from penetrating to the region of the semiconductor body when the material is applied and still in the plastic condition.

---

My invention relates to a semiconductor component having a semiconductor body and a cup-shaped housing. The housing has a wall and a base conjointly defining a hollow for receiving the semiconductor body. A cover having an opening and having a wall-like extension surrounding the semiconductor body is also provided and an input electrode for the semiconductor body extends through the opening in electrically insulated relation to the cover. A synthetic material covers the cover for encapsulating the semiconductor in gas-tight relation to the ambient.

It has been proposed to provide a semiconductor component having a cover covering a housing so that after the assembly of the semiconductor component, a synthetic material is applied. This synthetic material covering serves the purpose of gas-tight encapsulating the semiconductor seated in the interior of the housing and in this way protects the latter from the influence of the outer atmosphere. Since the synthetic material is usually applied under pressure to the cover, the unavoidable tolerances, for example between the cover and the housing wall, it is possible that synthetic material can penetrate into the interior of the housing and come into contact with the semiconductor body.

With semiconductors which are not joined by means of soldering or welding with one of the input electrodes and instead are simply joined thermally electrically under pressure, there is provided in addition in the interior of the housing a spring which presses the semiconductor body and the input electrode against the base of the housing. Should synthetic material come in contact with the spring it can occur that the spring travel and the spring characteristics can change when the synthetic material transforms into its hardened condition. This is above all disadvantageous if for adjusting a definite spring pressure no direct measurement can be made instead, the dimensioning of the spring travel is only possible by determining the spring pressure.

It is an object of my invention to provide a semiconductor component of the aforementioned type which permits a reliable sealing of the cover with respect to the synthetic material. Subsidiary to this object, it is an object of my invention to provide a semiconductor component wherein the synthetic material of the component covering is precluded from reaching the region of the semiconductor.

According to a feature of the invention, the cover is provided with a wall-like extension that surrounds the semiconductor body. The wall-like extension rests on the base of the housing whereat the wall-like extension has a sealing surface against the housing base. In addition, means are provided for pressing the sealing surface against the base; this prevents the synthetic material of the covering from penetrating the region of the semiconductor body. The pressing means preferably includes projections extending from the housing wall.

It is advantageous to make the cover and its wall-like extension from electrically insulating synthetic material. If desired, joint between input electrode and semiconductor body may be formed through a pressure contact or a so-called pressure stabilized solder contact can be used. With such contact, a spring is provided between the cover and the input electrode. The spring is braced against the cover to permit pressing the input electrode and the semiconductor body against the base of the housing. In this way a loosening of the solder joint is prevented, especially when the semiconductor component must respond to requirements which often change.

The invention will now be described with reference to the drawing which illustrates a semiconductor component equipped with an enclosure of synthetic material as required by the invention.

A semiconductor component is provided with a housing 1 which has a base region 2 and a wall 3. The base and wall are made of a thermally and electrically good conducting material such as copper. The base has a seating surface 4 in a portion of the housing bounded by the wall 3. The semiconductor 5 is placed upon the seating surface 4. An electrode 6 is seated on the semiconductor 5 and is joined with the incoming electrode 7. A spring 8 abuts electrode 6 and is braced against the insulating cover 9. The cover 9 is tensioned tightly by means of projections 10 on the wall of the housing which restrain the cover 9 from moving upwardly.

The cover 9 and the portion of the wall 3 of the housing is surrounded by a synthetic material enclosure 11. This enclosure 11 is placed, as a rule, under pressure by means of a form. To prevent the penetration of synthetic material, which is still in a plastic state, into the interior of the housing, that is, in the space where the spring 8, the electrode 6 and the semiconductor component 5 are disposed, there is provided a tight sealing passage 14 located concentrically in the cover 9. Through this passage, the input electrode 7 extends outwardly into the ambient where the semiconductor component 5 can be joined thermally and electrically with externally lying current supply means.

To make certain that no synthetic material penetrates into the inner space past the outer edge of the cover 9, the latter is provided with a wall portion 15. This wall portion 15 has a sealing surface 12 at its lower end which sits on top of the seating surface 4 of the base 2. The sealing surface 12 is pressed against the seating surface 4 by means of the projection 10.

The following favorable characteristics of the above-described arrangement are obtained: first, that the synthetic material placed under pressure on top of the cover of the semiconductor component is held away from the inner region of the housing by the sealing surface 12 of the wall portion 15 on the cover 9; second, since the synthetic material, as already mentioned, is applied under pressure by means of a foam or mold, the form also presses against the top surface of the cover 9 and, additionally, improves the sealing between the sealing surface 12 and the seating surface 4; and third, because the cover 9 has a wall portion, there is obtained, in addition, the advantage that the spacing from the lower side of the cover to the seating surface 4 can be maintained very precisely. With known characteristics of the spring 8, this permits the pressure with which the electrode 6 and the semiconductor component 5 press against the seating surface 4 of the base 2 to be determined very precisely. In addition to the foregoing, there is obtained the advantage that the semiconductor component 5 does not come in contact with the synthetic materials so that every influence on the electrical characteristics of the semiconductor component is precluded.

If the projections 10 are so dimension as illustrated in the drawing, that is that their surfaces contacting the top surface of the cover 9 run parallel to the latter, the cover, whose outer diameter is smaller than the inner diameter of the housing wall, has a small amount of lateral play. For the situation wherein the semiconductor component is soldered to the electrode and to the base, it is not imperative that the portions being soldered lie precisely at the center of the base region.

The bottom portion of the wall 3 of the housing can be provided with a knurled portion for facilitating the insertion of the semiconductor component into a cooling body or other carrying assembly portion.

While the invention has been described by means of a specific example and in a specific embodiment, I do not wish to be limited thereto for obvious modifications will occur to those skilled in the art without departing from the spirit and scope of the invention.

I claim:

1. A semiconductor component comprising a semiconductor body, a cup-shaped housing having a wall and a base conjointly defining a hollow for receiving said semiconductor body, a cover having an opening and having a wall-like extension surrounding said semiconductor body, said cover being made of electrically insulating material, an electrode for said semiconductor extending through said opening in said cover in electrically insulated relation to said cover, a spring member braced against said cover for pressing said electrode and said semiconductor body against said base of said housing, a covering of synthetic material over said cover for sealing said semiconductor body in gas-tight relation to the ambient, said extension on said cover having an end surface whereat said cover rests upon said base of said housing, pressure means comprising projections having respective surfaces for contacting the surface of said cover, said respective surfaces being substantially parallel to said cover surface, said wall of said housing and said wall-like extension being cylindrical, the outer diameter of said wall-like extension of said cover being less than the inner diameter of said wall, said pressure means exerting a force on said cover to press said end surface against said base in seal-tight relation to the latter, whereby said synthetic material is prevented from penetrating to the region of said semiconductor body when said material is applied and still in the plastic condition.

References Cited

UNITED STATES PATENTS

| 3,475,662 | 10/1969 | Zido | 317—235 X |
| 3,059,157 | 10/1962 | English et al. | 317—234 P |
| 3,299,328 | 1/1967 | Martin et al. | 317—234 P |
| 3,299,328 | 1/1967 | Martin et al. | 317—234 P |
| 3,474,302 | 10/1969 | Blundell | 317—234 P |

FOREIGN PATENTS

| 2,002,396 | 10/1969 | France | 317—234 P |

JOHN W. HUCKERT, Primary Examiner

A. J. JAMES, Assistant Examiner

U.S. Cl. X.R.

317—234 A, 234 E, 234 F, 234 P; 174—52